(12) United States Patent
Tokuda et al.

(10) Patent No.: US 9,298,394 B2
(45) Date of Patent: Mar. 29, 2016

(54) DATA ARRANGEMENT METHOD AND DATA MANAGEMENT SYSTEM FOR IMPROVING PERFORMANCE USING A LOGICAL STORAGE VOLUME

(75) Inventors: Seisuke Tokuda, Ebina (JP); Kazutomo Ushijima, Ebina (JP); Akira Shimizu, Yokohama (JP); Michiko Tanaka, Chigasaki (JP); Shinji Fujiwara, Sagamihara (JP); Nobuo Kawamura, Atsugi (JP)

(73) Assignee: HITACHI, LTD., Tokyo (JP)

( * ) Notice: Subject to any disclaimer, the term of this patent is extended or adjusted under 35 U.S.C. 154(b) by 64 days.

(21) Appl. No.: 13/389,893

(22) PCT Filed: Aug. 10, 2010

(86) PCT No.: PCT/JP2010/063562
§ 371 (c)(1),
(2), (4) Date: Feb. 10, 2012

(87) PCT Pub. No.: WO2011/065071
PCT Pub. Date: Jun. 3, 2011

(65) Prior Publication Data
US 2012/0151138 A1  Jun. 14, 2012

(30) Foreign Application Priority Data
Nov. 30, 2009 (JP) ................................ 2009-271647

(51) Int. Cl.
*G06F 12/00* (2006.01)
*G06F 13/00* (2006.01)
(Continued)

(52) U.S. Cl.
CPC .............. *G06F 3/0665* (2013.01); *G06F 3/061* (2013.01); *G06F 3/064* (2013.01); *G06F 3/0689* (2013.01)

(58) Field of Classification Search
CPC ....... G06F 3/0665; G06F 3/061; G06F 3/064; G06F 3/0689

USPC .................. 711/E12.019, 203, 113, 114, 112; 714/E11.034
See application file for complete search history.

(56) References Cited

U.S. PATENT DOCUMENTS 5,806,059 A  *  9/1998 Tsuchida et al.
6,058,489 A  *  5/2000 Schultz et al. ............... 714/6.32
(Continued)

FOREIGN PATENT DOCUMENTS

JP     11-282637     10/1999
JP     2005-056077    3/2005
(Continued)

OTHER PUBLICATIONS

Charles Milligan & Sid Selkirk, Online Storage Vitualization: The key to managing the data explosion, Jan. 7-10, 2002 IEEE, Proceedings of the 35th Hawaii International Conference on System Sciences 2002, pp. 3052-3060.*
(Continued)

*Primary Examiner* — Tuan Thai
*Assistant Examiner* — Shane Woolwine
(74) *Attorney, Agent, or Firm* — Baker Botts L.L.P.

(57) ABSTRACT

According to this invention, a data arrangement method, the computer connected to a storage system which provides a plurality of logical storage devices comprising a plurality of physical storage devices arranges data in a logical storage volume constructed by integrating the plurality of logical storage devices. The method includes: a step wherein the computer receives an instruction to build the logical storage volume using the plurality of logical storage devices or to rebuild the constructed logical storage volume; a step wherein the computer obtains information about the plurality of physical storage devices constituting each of the plurality of logical storage devices included in the received instruction; and a step wherein the arrangement position of data into the logical storage volume is determined on the basis of the obtained information about the plurality of physical storage devices.

15 Claims, 9 Drawing Sheets

(51) Int. Cl.
*G06F 13/28* (2006.01)
*G06F 3/06* (2006.01)

(56) References Cited

U.S. PATENT DOCUMENTS

| | | | |
|---|---|---|---|
| 6,311,251 B1 * | 10/2001 | Merritt et al. | 711/114 |
| 6,347,359 B1 | 2/2002 | Smith et al. | |
| 2002/0035667 A1 * | 3/2002 | Bruning et al. | 711/114 |
| 2005/0027719 A1 | 2/2005 | Maciel et al. | |
| 2006/0143379 A1 * | 6/2006 | Khan et al. | 711/114 |
| 2008/0162810 A1 | 7/2008 | Taguchi et al. | |
| 2009/0125678 A1 | 5/2009 | Tokuda et al. | |

FOREIGN PATENT DOCUMENTS

| | | |
|---|---|---|
| JP | 2008-165620 | 7/2008 |
| JP | 2009-116796 | 5/2009 |

OTHER PUBLICATIONS

AJ Lewis, LVM Howto, Nov. 27, 2006, alewis@rackable.com.

* cited by examiner

FIG. 4

PHYSICAL STORAGE DEVICE INFORMATION 281

| HOST LOGICAL STORAGE DEVICE NUMBER | LOGICAL STORAGE DEVICE NUMBER | LOGICAL STORAGE DEVICE CAPACITY | RAID GROUP NUMBER | RAID LEVEL | PHYSICAL STORAGE DEVICE NUMBER | PHYSICAL STORAGE DEVICE TYPE |
|---|---|---|---|---|---|---|
| 101 | 01 | 100GB | 00 | 5 | 00,01,02 | FC,FC,FC |
| 102 | 02 | 100GB | 01 | 0 | 11,12 | FC,FC |
| ... | ... | ... | ... | ... | ... | ... |

FIG. 5

DATA ARRANGEMENT MANAGEMENT INFORMATION 2100

| 2101 | 2102 | 2103 | 2104 | 2105 | 2106 |
|---|---|---|---|---|---|
| LOGICAL STORAGE VOLUME NAME | LOGICAL STORAGE VOLUME NUMBER | LOGICAL STORAGE VOLUME CAPACITY | HOST LOGICAL STORAGE DEVICE NUMBER | DATA ARRANGEMENT RATIO | STRIPE SIZE |
| LVOL1 | 1001 | 200GB | 101,102 | 3,2 | 16K |
| ... | ... | ... | ... | ... | ... |

FIG. 8

DATA ARRANGEMENT MANAGEMENT INFORMATION 2100

| 2101 | 2102 | 2103 | 2104 | 2105 | 2106 |
|---|---|---|---|---|---|
| LOGICAL STORAGE VOLUME NAME | LOGICAL STORAGE VOLUME NUMBER | LOGICAL STORAGE VOLUME CAPACITY | HOST LOGICAL STORAGE DEVICE NUMBER | DATA ARRANGEMENT RATIO | STRIPE SIZE |
| LVOL1 | 1001 | 200GB | 101,102 | 1,1 | 24K,16K |
| ... | ... | ... | ... | ... | ... |

DATA ARRANGEMENT METHOD AND DATA MANAGEMENT SYSTEM FOR IMPROVING PERFORMANCE USING A LOGICAL STORAGE VOLUME

BACKGROUND OF THE INVENTION

This invention relates to a data arrangement method and a data management system, and more particularly, to a technology of arranging data on a storage system by a computer.

It is indispensable for corporate activities to utilize a large amount of business data. Therefore, systems for accumulating the large amount of business data in databases (hereinafter, referred to as DBs), and multidimensionally analyzing the accumulated data are widely used.

In the data analysis processing, a database management system (hereinafter, referred to as DBMS) receives a query, and issues a request to read a large amount of data to a storage system storing the DB.

If a plurality of storage devices are provided from the storage system to a computer executing the DBMS, a unified storage volume technology for providing a plurality of unified storage devices is known as one of conventional technologies for efficiently processing a large number of data read requests.

The unified storage volume technology causes an application program (hereinafter, referred to as AP) such as a DBMS or an operating system (hereinafter, referred to as OS) to unify storage devices provided by the storage system. The unified storage volume technology then evenly stripes and arranges a DB on the unified storage devices in a distributed manner, to thereby enable even use of the plurality of storage devices (A J Lewis, LVM HOWTO, Nov. 27, 2006, pages 31-65).

SUMMARY OF THE INVENTION

In the above-mentioned conventional storage system, instead of directly providing physical storage devices for the computer, a function of virtually providing a logical storage device, which is a combination of physical storage devices, is generally employed.

The redundant array of independent disks (RAID) function for combining a plurality of physical storage devices within a system, thereby realizing redundancy and an increased speed, is widely employed as a specific virtualization function for the storage system.

While the storage virtualization function by means of the RAID function is generally used, cases where a plurality of logical storage devices different in configuration of combining physical storage devices are provided for a computer can frequently occur in a real operation.

On this occasion, the unified storage volume technology evenly distributes and arranges data on the plurality of logical storage devices recognized by the APs and the OS. Therefore, according to this conventional technology, if a plurality of logical storage devices different in the combinational configuration of physical storage devices are provided, there has been a problem that performances of all the physical storage devices cannot be evenly used for a request to access an entire range of the stored data, and the request to read the large amount of data cannot be efficiently processed.

For example, if a logical storage device A is constituted of four physical storage devices, a logical storage device B is constituted of three physical storage devices, the logical storage device A and the logical storage device B are unified into a logical storage volume X, and the logical storage volume X is provided for a computer by means of the conventional unified storage volume technology in a storage system, the conventional technology evenly distributes the quantity of data read/written by the computer to the logical storage device A and the logical storage device B. If performances of the physical storage devices constituting the logical storage volume X are even, and the logical storage device A and the logical storage device B are constituted by means of the RAID function (RAID 5 in which parities are arranged in a distributed manner, for example), the read/write performance of the logical storage device A exceeds that of the logical storage device B. According to the conventional technology, the same amounts of data are read/written on the logical storage device A and the logical storage device B in the logical storage volume X of the conventional technology. As a result, there has been a problem in that the logical storage device A cannot sufficiently exert the read/write performance due to the obstruction by the read/write performance of the logical storage device B.

This invention has been made in view of the above-mentioned problem, and therefore has an object to provide a data arrangement method capable of, for providing a computer with a plurality of logical storage devices different in combination of physical storage devices, even use of the physical storage devices constituting the logical storage devices by using the virtualization function of the storage system.

According to this invention, a data arrangement method, the computer connected to a storage system which provides a plurality of logical storage devices comprising a plurality of physical storage devices arranges data in a logical storage volume constructed by integrating the plurality of logical storage devices. The method includes: a step wherein the computer receives an instruction to construct the logical storage volume using the plurality of logical storage devices or to reconstruct the constructed logical storage volume; a step wherein the computer obtains information about the plurality of physical storage devices constituting each of the plurality of logical storage devices included in the received instruction; and a step wherein the arrangement position of data into the logical storage volume is determined on the basis of the obtained information about the plurality of physical storage devices.

Therefore, according to the embodiment of this invention, even if the storage system provides a computer with a plurality of logical storage devices different in configuration of combining physical storage devices, arrangement positions of data on the logical storage devices can be determined in accordance with configuration information on the physical storage devices, and the arrangement positions enable even use of the physical storage devices. As a result, efficiency of processing of reading a large amount of data can be increased by utilizing input/output processing performances of all the physical storage devices.

BRIEF DESCRIPTION OF THE DRAWINGS

FIG. 4 is an explanatory diagram illustrating an example of the physical storage device information according to the embodiment of this invention.

FIG. 5 is an explanatory diagram illustrating an example of the data arrangement management information according to the embodiment of this invention.

FIG. 8 is an explanatory diagram illustrating another example of the data arrangement management information according to the embodiment of this invention.

DETAILED DESCRIPTION OF THE PREFERRED EMBODIMENT

A description is now given of an embodiment of this invention referring to the accompanying drawings.

<Configuration of Information Processing System>

Figure 1A:
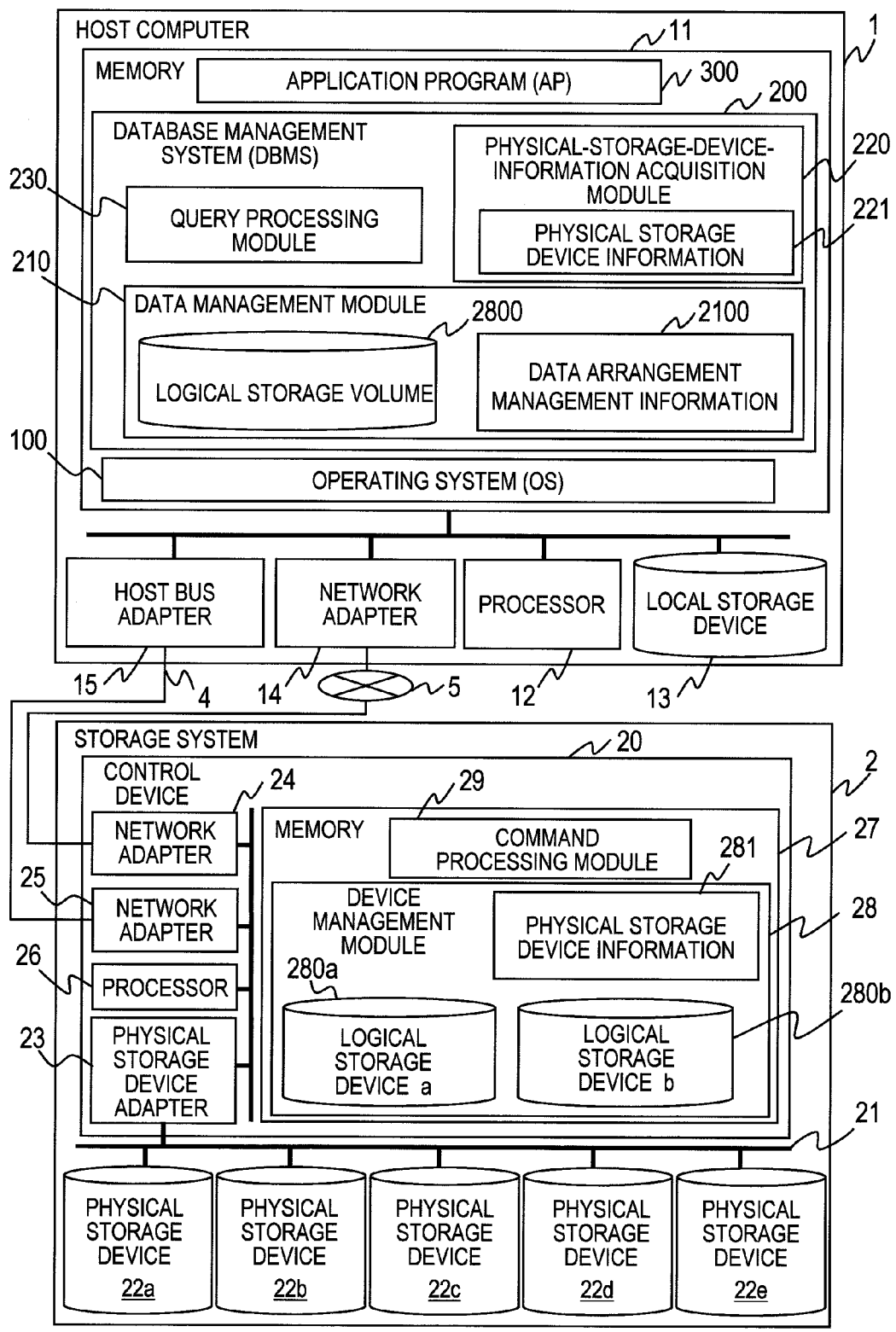
FIG. 1A is a block diagrams illustrating a hardware configuration and a logical configuration of an information processing system according to the embodiment of this invention.
Figure 1B:
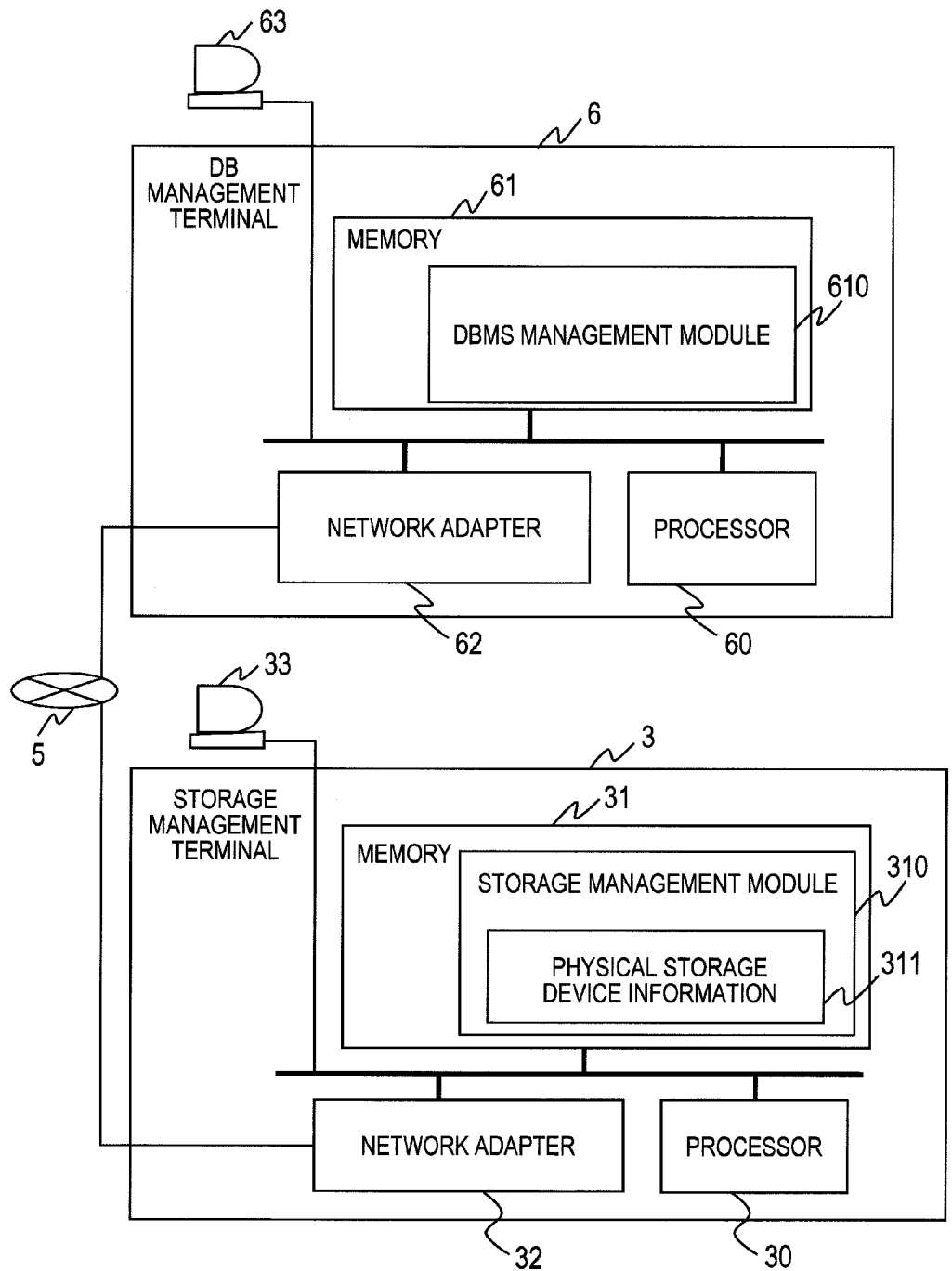
FIG. 1B is a block diagrams illustrating a hardware configuration and a logical configuration of an information processing system according to the embodiment of this invention.

FIGS. 1A and 1B are block diagrams illustrating a hardware configuration and a logical configuration of an information processing system according to the embodiment of this invention. A description is first given of the hardware configuration.

The information processing system illustrated in FIGS. 1A and 1B includes a host computer 1, a storage system 2, a storage management terminal 3, a storage area network (hereinafter, referred to as SAN) 4, a network (management network) 5, and a database management terminal 6.

The host computer 1 is a computer such as a personal computer, a workstation, or a mainframe. On the host computer 1, an operating system (hereinafter, referred to as OS) 100 suited to the type of the computer, a database management system (hereinafter, referred to as DBMS) 200 for accumulating and managing business data, and application programs (hereinafter, referred to as APs) 300 for issuing queries to the DBMS 200 operate. The OS 100, the DBMS 200, and the APs 300 are described later.

The host computer 1 includes a processor 12, a memory 11, a local storage device 13, a host bus adapter 15, and a network adapter 14.

The processor 12 executes programs such as the OS 100, the DBMS 200, and the APs 300. The memory 11 temporarily stores programs executed by the processor 12 and data used by the programs. The local storage device 13 functions as a storage medium for storing data used by programs such as the APs 300 and the DBMS 200, and data used by the programs. The host bus adapter 15 is an interface coupling the SAN 4 and the host computer 1 to each other. The host bus adapter 14 is an interface coupling the network 5 and the host computer 1 to each other.

It should be noted that the host computer 1 may include a plurality of components such as the processor 12 for securing redundancy. Moreover, the host computer 1 includes an input device and a display device, which are not illustrated.

The storage system 2 is a system including a single storage device such as a disk device or a plurality of storage devices such as a disk array. Moreover, the storage system 2 stores data and programs used by the host computer 1. Then, the storage system 2 receives an input/output (hereinafter, referred to as I/O) processing request from the host computer 1, carries out processing corresponding to the I/O processing request, and transmits a processing result to the host computer 1.

The storage system 2 includes a control device 20, a coupling interface 21, and physical storage devices 22a to 22e. The physical storage devices 22a to 22e are generally referred to as physical storage devices 22 in the following description.

Moreover, the physical storage device 22 stores the data and the programs used by the host computer 1. The physical storage device 22 is a non-volatile storage device, and is constituted of a hard disk drive including a magnetic disk and a magnetic head, for example. The coupling interface 21 is constituted of a local bus, for example, and couples the physical storage devices 22 and the control device 20 to each other.

The control device 20 carries out processing of the I/O processing request from the host computer 1, and control of the physical storage devices 22. The control device 20 includes a processor 26, a memory 27, a physical storage device adapter 23, a network adapter 24, and a network adapter 25.

The processor 26 executes a predetermined control program. The memory 27 stores programs executed by the processor 26, information required for executing the programs, and setting information and configuration information on the storage system 2. The memory 27 further temporality stores data input to the storage system 2 from the host computer 1, data to be transferred from the storage system 2 to the host computer 1, or data input/output within the storage system 2. The memory 27 may be constituted of a non-volatile memory and a cache memory, may store the programs and the configuration information in the non-volatile memory, and may store the input/output data in the cache memory.

The physical storage device adapter 23 couples to the physical storage devices 22 via the coupling interface 21. The network adapter 25 couples the storage system 2 and the SAN 4 to each other. The network adapter 24 couples the storage system 2 and the network 5 to each other.

It should be noted that the storage system 2 may include a plurality of control devices 20. Moreover, in order to secure redundancy, the storage system 2 may have a redundant configuration in which each of the components within the system such as the memory 27, the physical storage device adapter 23, and the coupling interface 21 is duplexed.

The storage management terminal 3 is a computer for managing the components within the storage system 2. An administrator of the storage system 2 inputs setting information to the storage management terminal 3 when the administrator manages the components of the storage system 2. The storage management terminal 3 transmits contents input by the administrator to the storage system 2 via the network 5.

The storage management terminal 3 includes a processor 30, a memory 31, and a network adapter 32 as the host computer 1 does. The storage management terminal 3 may include a local storage device, which is not illustrated. Moreover, the storage management terminal 3 includes a console 33 including an input device and an output device.

The database management terminal 6 is a computer for managing the DBMS 200 executed on the host computer 1. An administrator of the DBMS 200 inputs setting information to the database management terminal 6 when the administrator manages the DBMS 200 of the host compute 1. The database management terminal 6 transmits contents input by the administrator to the host computer 1 via the network 5.

The database management terminal 6 includes a processor 60, a memory 61, and a network adapter 62 as the host computer 1 does. The database management terminal 6 may include a local storage device, which is not illustrated. Moreover, the database management terminal 6 includes a console 63 including an input device and an output device.

The SAN 4 couples the host computer 1 and the storage system 2 to each other, and is used to transmit the I/O processing request from the host computer 1 to the storage system 2. An optical fiber or a copper wire is used for the SAN 4. Moreover, a communication protocol such as the Fibre Channel, the small computer system interface (SCSI), or the transmission control protocol/internet protocol (TCP/IP) is used on the SAN 4.

The network 5 functions as a management network for the information processing system, and couples the host computer 1, the storage system 2, the storage management terminal 3, and the database management terminal 6 to one another. The network 5 is used to communicate the configuration information on the storage system 2 and the management information on the DBMS 200 of the host computer 1 among the storage system 2, the host computer 1, the storage management terminal 3, and the database management terminal 6. A cable and a communication protocol used for the network 5 may be the same as those used for the SAN 4 or may be different from those used for the SAN 4.

<Logical Configuration of Storage System 2 of Information Processing System>

A description is now given of a logical configuration of the information processing system in FIGS. 1A and 1B. The control device 20 of the storage system 2 stores programs constituting a device management module 28 and a command processing module 29 in the memory 27 in order to control processing by the storage system 2 as illustrated in FIG. 1A. The control device 20 controls processing described later by executing these programs by the processor 26.

A program constituting the device management module 28 is executed by the control device 20 for managing physical storage devices 22 and logical storage devices 280*a* and 280*b* provided for the host computer 1. It should be noted that, hereinafter, the logical storage devices 280*a* and 280*b* are generally referred to as logical storage devices 280.

The control device 20 executes the device management module 28 to thereby combine the plurality of physical storage devices 22 (illustrated by dotted lines on the memory 27 in FIG. 2) into redundant array of independent disks (RAID) groups. By configuring the RAID groups, the storage system 2 can reduce an I/O processing time by means of the striping technology, thereby distributing and storing data to and in the plurality of physical storage devices 22, and can increase reliability of the data by means of the parity recording technology, which generates a parity of pieces of data located at the same position on at least two physical storage devices, and stores the parity on another physical storage device. The configuration of the RAID group may be the mirroring configuration which simultaneously copies a content of one physical storage device 22 to another physical storage device 22.

The control device 20 executes the device management module 28, thereby providing the host computer 1 with one logical storage device 280 from a storage space generated by the plurality of physical storage devices 22 constituting one RAID group.

Figure 2:
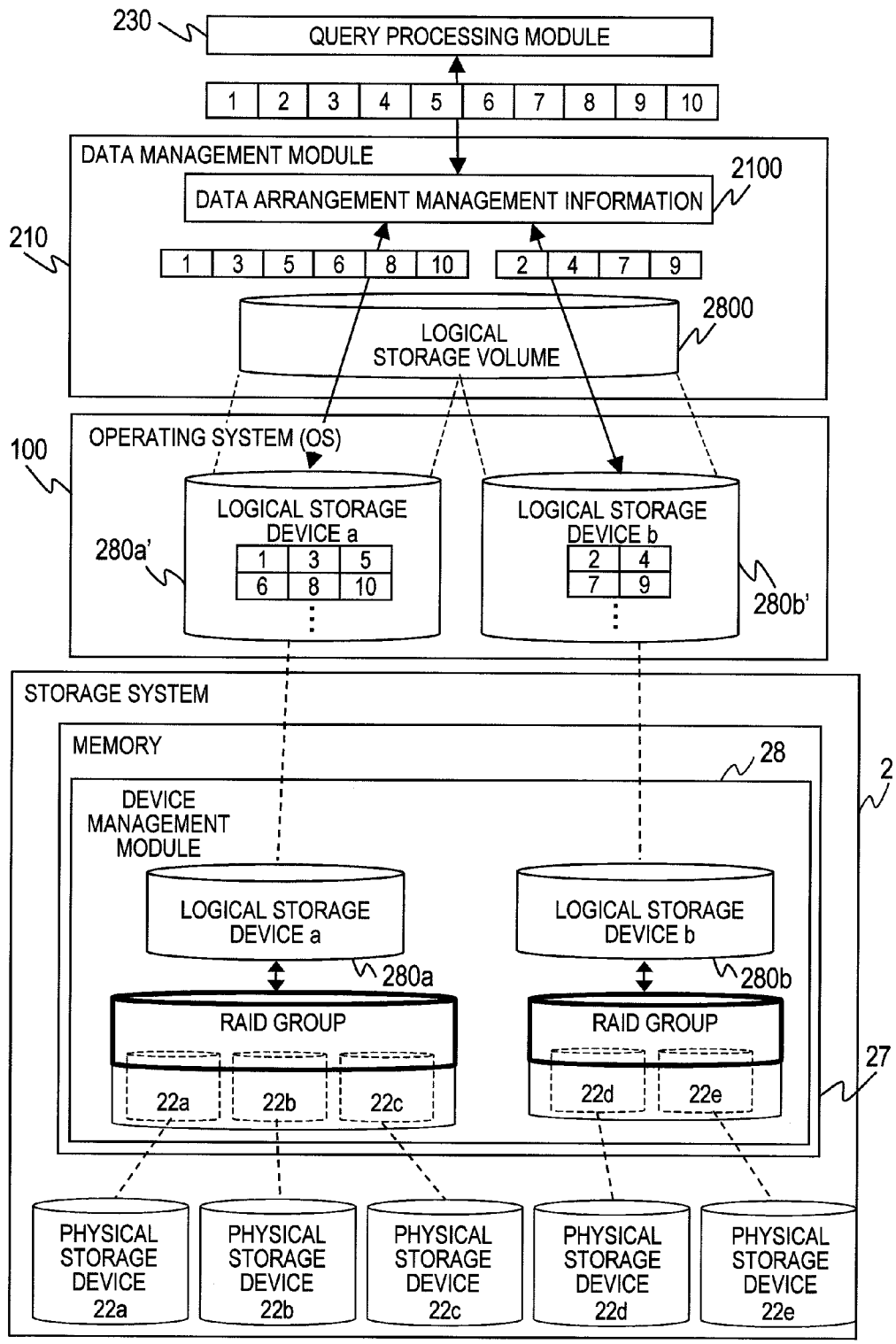
FIG. 2 is a block diagram illustrating a relationship between logical storage devices provided by the storage system according to the embodiment of this invention.

FIG. 2 is a block diagram illustrating a relationship between logical storage devices provided by the storage system 2 for the host computer 1 and physical storage devices. In the example illustrated in FIG. 2, a logical storage device "a" (280*a*) from a RAID group constituted of the physical storage devices 22*a*, 22*b*, and 22*c*, and a logical storage device "b" (280*b*) from a RAID group constituted of the physical storage devices 22*d* and 22*e* are provided for the host computer 1.

The control device 20 executes the device management module 28, thereby managing physical storage device information 281, which is information on the physical storage devices 22 of the logical storage devices 280. The physical storage device information 281 is described later in detail referring to FIG. 4.

The control device 20 executes the device management module 28, thereby handling requests from the host computer 1 and the storage management terminal 3. For example, the device management module 28 defines and sets the logical storage devices 280, and transmits the physical storage device information 281 in response to a request from the storage management terminal 3.

The control device 20 executes the program of the device management module 28 in order to carry out the I/O processing. The device management module 28 calculates, based on the physical storage device information 281, an address of a physical storage device 22 corresponding to a logical storage device 280 specified by an I/O processing request. The control device 20 makes an access to the physical storage device 22 based on the calculation result.

Moreover, when the control device 20 receives an I/O processing request from the host computer 1 via the network adapter 24, the control device 20 executes the program of the command processing module 29.

If the I/O processing request received from the host computer 1 is a write processing request for data, the command processing module 29 carries out processing of writing data transferred from the host computer 1 into a predetermined area of the memory 27 or the physical storage device 22, and the like.

If the command processing module 29 receives a read processing request for data from the host computer 1, the command processing module 29 carries out processing of reading data corresponding to the read processing request from a predetermined area of the memory 27 or the physical storage device 22, and transferring the read data to the host computer 1, and the like.

If the control device 20 receives a processing request other than those of reading or writing data from the host computer 1, the control device 20 operates the command processing module 29 to carry out the requested processing. For example, this request includes an Inquiry command (command of instructing the device search) of the SCSI from the host computer 1 or the storage management terminal 3.

The storage system 2 can dynamically change the configuration of the RAID group containing the logical storage device 280 provided for the host computer 1. As an example of the dynamic configuration change of the RAID group, a RAID group constituted of two physical storage devices is reconstituted with three physical storage devices by adding one physical storage device. The dynamic configuration change of the RAID group is not recognized by the host compute 1, and is processed in the background.

When the configuration of the RAID group is dynamically changed, the control device 20 executes the programs of the command processing module 29 and the device management module 28, thereby carrying out migration processing for data caused by the change.

The control device 20 executes the command processing module 29, thereby reading data in the physical storage device 22 of a migration source into the memory 27, and writes the read data to a physical storage device 22 of a migration destination. Moreover, the control device 20 executes the device management module 28, thereby applying the change in the physical storage device information 281 caused by the configuration change of the RAID group. It should be noted that the control device 20 can receive an I/O processing request intended for all data including a subject of migration even during the migration of data caused by a dynamic configuration change of the RAID group.

<Software Configurations of Host Computer 1, Storage Management Terminal 3, and Database Management Terminal 6 of Information Processing System>

As illustrated in FIG. 1A, the host computer 1 includes, in the memory 11 and the local storage device 13, various programs including the OS 100, the DBMS 200 for accumulating the business data and managing the accumulated business data, and APs 300 for issuing queries to the DBMS 200, and information required for executing the programs. It should be noted that the AP 300 may be executed on another computer coupled to the network 5 other than the host computer 1 on which the DBMS 200 is running. In this case, the DBMS 200 receives a query from the AP 300 via the network 5.

The OS 100 carries out control of the entire computer such as management of the memory 11 and the local storage device 13. Moreover, the OS 100 of the host computer 1 recognizes the presence of the two logical storage devices 280a and 280b provided by the storage system 2 as logical storage devices 280a' and 280b' as illustrated in FIG. 2. The logical storage devices 280a' and 280b' are generally referred to as logical storage devices 280'. The logical storage devices 280' recognized by the DBMS 200 or the OS 100 of the host computer 1 are the same as the logical storage devices 280 provided by the storage system 2 according to this embodiment.

The DBMS 200 stores and manages a database (hereinafter, referred to as DB) of the business data in the storage system 2. The DB is stored in the physical storage devices 22 via the logical storage devices 280a' and 280b' recognized by the host computer 1, and constituted of a plurality of tables and indices.

The DBMS 200 is constituted of a data management module 210, a physical storage device information acquisition module 220, and a query processing module 230 as illustrated in FIG. 1A.

The data management module 210 unifies the logical storage devices 280a' and 280b' recognized by the OS 100 into a logical storage volume 2800, and manages the logical storage volume 2800. The DBMS 200 stores the DB in the logical storage volume 2800. The data management module 210 builds data arrangement management information 2100, thereby managing the logical storage volume 2800. The data arrangement management information 2100 contains a ratio of data distributed to and arranged on (stored in) the plurality of logical storage devices 280a' and 280b' constituting the logical storage volume 2800. The data arrangement management information 2100 is described later in detail referring to FIG. 5.

The physical storage device information acquisition module 220 receives an instruction from the data management module 210, thereby acquiring the physical storage device information 281, which is the information on the physical storage devices 22 of the storage system 2 constituting the logical storage devices 280a' and 280b', from the storage system 2 or physical storage device information 311 described later from the storage management terminal 3, and retains the physical storage device information 281 or the physical storage device information 311 as the physical storage device information 221. Moreover, the physical storage device information acquisition module 220 provides a dedicated interface, thereby acquiring information from the database management terminal 6 and the like.

The query processing module 230 receives a query from the AP 300, carries out a plurality of pieces of database processing in response to the received query, and returns an execution result to the AP 300. When it becomes necessary to read data from the DB, the query processing module 230 issues a data read request to the storage system 2 via the OS 100 during the execution of the database processing.

The DBMS 200 can build a database buffer (hereinafter, referred to as DB buffer) for temporarily storing data by using a part of the memory 11 and the local storage device 13. Moreover, the data management module 210 containing the data arrangement management information 2100 and the physical storage device information acquisition module 220 may operate not within the DBMS 200 but within the OS 100.

FIG. 4 is an explanatory diagram illustrating an example of the physical storage device information 281 of the storage system 2. It should be noted that the physical storage device information 311 of the storage management terminal 3 is the same as the physical storage device information 281 of the storage system 2, and the physical storage device information 221 of the DBMS 200 is the same as a table formed by removing a logical storage device number 402 described later from the physical storage device information 281 of the storage system 2, and hence duplicate description thereof is omitted.

Columns of the physical storage device information 281 are respectively a host logical storage device number 401 for storing the number of a logical storage device provided for the host computer 1 by the storage system 2, the logical storage device number 402 for storing the number of the logical storage device as an identifier internally managed by the storage system 2, a logical storage device capacity 403 for storing a storage capacity of the logical storage device corresponding to the logical storage device number, a RAID group number 404 for storing a RAID group identifier of the logical storage device, a RAID level 405 for storing the RAID level (type) of the logical storage device, a physical storage device number 406 for storing identifiers of a plurality of physical storage devices 22 constituting the RAID group, and a physical storage device type 407 for storing types of the respective physical storage devices 22.

The host logical storage device number 401 is an identifier allocated to a logical storage device provided for the host computer 1 by the device management module 28 of the storage system 2. The DBMS 200 and the OS 100 identify a logical storage device provided by the storage system 2 by the host logical storage device number 401. The logical storage device number 402 to the logical storage device type 407 are information on the logical storage device 280 and the physical storage devices 22 set by the device management module 28 of the storage system 2.

The logical storage device number 402 is an identifier of the logical storage device set by the storage system 2. The logical storage device capacity 403 is the capacity of the logical storage device provided for the host computer 1 by the storage system 2.

The RAID group number 404 and the RAID level 405 are information on the RAID configuration of the logical storage device, and are managed by the storage system 2. The RAID level 405 stores the type of the RAID such as 0, 10, 5, and 6. The physical storage device number 406 stores identifiers of the plurality of physical storage devices 22 which are managed by the storage system 2 and constitute the RAID group.

The physical storage device type 407 stores types of the plurality of physical storage devices 22 constituting the RAID group indicated by the RAID group number 404, and stores types of interface such as FC, SATA, and SAS as the types.

In addition to the above-mentioned examples, information manageable by the device management module 28 of the storage system 2 may be included in the physical storage device information 221, and the seek time and the rotation speed of the physical storage devices 22, for example, may be stored as performance information.

As described above, the host computer 1 using the storage system 2 can recognize the RAID configuration and the physical storage devices 22 of the logical storage devices 280 (280') by forwarding the physical storage device information 281 managed by the device management module 28 of the storage system 2 to the physical storage device information 221 of the DBMS 200 of the host computer 1 or to the physical storage device information 311 of the storage management terminal 3.

FIG. 5 is an explanatory diagram illustrating an example of the data arrangement management information 2100 managed by the data management module 210 of the DBMS 200.

Columns of the data arrangement management information 2100 are respectively a logical storage volume name 2101 for storing a name of a logical storage volume managed by the DBMS 200 (or OS 100), a logical storage volume number 2102 for storing an identifier of the logical storage volume managed by the DBMS 200 (or OS 100), a logical storage volume capacity 2103 for storing a capacity of the logical storage volume, a host logical storage device number 2104 for storing identifiers of logical storage devices constituting the logical storage volume, a data arrangement ratio 2105 for storing a ratio for distributing the data to the logical storage devices by the data management module 210, and a stripe size 2106 for storing a unit of the data (stripe size) to be distributed to the logical storage devices by the data management module 210.

The logical storage volume 2800 is constituted of a plurality of logical storage devices 280, and the host logical storage device number 2104 of the data arrangement management information 2100 stores the host logical storage device numbers 401 of the host logical storage devices constituting the logical storage volume 2800 out of the host logical storage devices identified by the host logical storage device numbers 401 illustrated in FIG. 4.

The data arrangement ratio 2105 is set by the data management module 210, and stores a ratio of data to be read/written (to be allocated) on the logical storage devices identified by the host logical storage device number 2104. The host logical storage device number 2104 stores "101" and "102" as illustrated, and if the data arrangement ratio 2105 is "3:2", it means that the data is arranged at the ratio of "3" (3/5) on the logical storage device having the host logical storage device number 2104 of "101" to "2" (2/5) on the logical storage device having the host logical storage device number 2104 of "102". Moreover, the stripe size 2106 is also a value set by the data management module 210.

Referring again to FIG. 1B, the storage management terminal 3 stores a program of a storage management module 310 and information required for executing the program in the memory 31 and the local storage device (not shown). The storage management terminal 3 may include an OS, which is not illustrated, for controlling the computer.

The storage management module 310 manages a configuration of the storage system 2. Moreover, the storage management module 310 acquires, from the storage system 2, and stores the physical storage device information 311 on the physical storage devices 22 constituting the logical storage devices 280 in the storage system 2. The physical storage device information 311 is the same as the physical storage device information 281 existing on the device management module 28 of the storage system 2. The storage management module 310 updates the physical storage device information 311 periodically or when the physical storage device information 281 is updated, thereby synchronizing this information with that in the storage system 2.

The database management terminal 6 then stores a program for managing a DBMS management module 610 and information required for executing the program in the memory 61 and the local storage device (not shown). The database management terminal 6 may include an OS, which is not illustrated, for controlling the computer.

The DBMS management module 610 manages the DBMS 200 of the host computer 1. The DBMS management module 610 determines a configuration of the logical storage volume 2800 from/to which the DBMS 200 of the host computer 1 reads/writes the business data, and instructs the DBMS 200 of the host computer 1 to provide the configuration, thereby managing the DBMS 200, for example.

Figure 6:
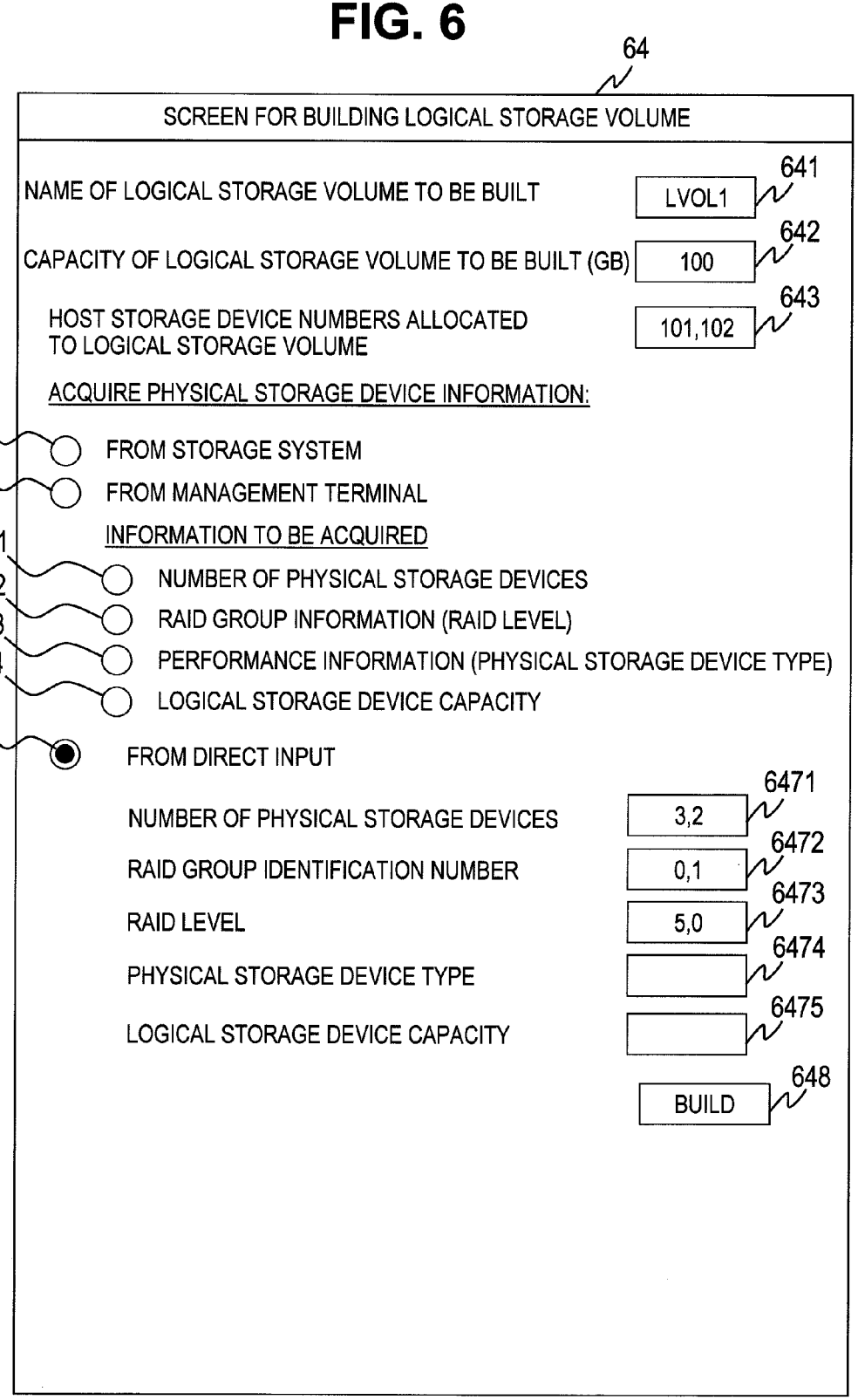
FIG. 6 is a screen image illustrating an example of the GUI output to the console by the DBMS management module according to the embodiment of this invention.

In order for that, the DBMS management module 610 outputs a graphical user interface (GUI) to the display device of the console 63 as illustrated in FIG. 6 as described later, thereby receiving an input from the administrator. The DBMS management module 610 receives from the input device of the console 63 an instruction to build the logical storage volume 2800 using the plurality of the logical storage devices 280a' and 280b', or an instruction to rebuild the logical storage volume 2800 already built. The DBMS management module 610 then transmits the received instruction to build or rebuild the logical storage volume 2800 to the DBMS 200 of the host computer 1.

FIG. 6 is a screen image illustrating an example of the GUI output to the console 63 by the DBMS management module 610 of the database management terminal 6. The screen in FIG. 6 is a user interface for building a logical storage volume, and is provided by the DBMS 200 to the database management terminal 6. It should be noted that the DBMS 200 can provide the host computer 1 and other computers including a display device with the GUI in FIG. 6. It should be noted that the DBMS 200 can provide an equivalent interface in a form of the command line.

A database (DB) administrator for managing the DBMS 200 of the host computer 1 uses this screen on the database management terminal 6 to control the DBMS 200 to acquire the physical storage device information and to build the logical storage volume.

In FIG. 6, a window 64 is mainly constituted of fields 641 to 643 for storing specifications of the logical storage volume to be built by the data management module 210, checkboxes 645 to 647 for selecting destinations from which the physical storage device information is acquired, and a build execution button 648 for instructing to start building (or rebuilding) the logical storage volume 2800.

The field 641 stores a name of the logical storage volume 2800 to be built by the data management module 210. The field 642 stores the capacity of the logical storage volume 2800. The filed 643 stores identifiers (numbers) of logical storage devices 280' to be allocated to the logical storage volume 2800. The identifier of the logical storage device 280' may be selected from the host logical storage device number 401 of the physical storage device information 281 illustrated in FIG. 4.

If the administrator then selects the checkbox 645 for selecting the destination from which the physical storage device information is acquired, this selection indicates that the information on the physical storage devices is to be acquired from the physical storage device information 281 of the storage system 2. If the administrator selects the checkbox

646, this selection indicates that the information on the physical storage devices is to be acquired from the physical storage device information 331 of the storage management terminal 3. If the administrator selects the checkbox 647, values input to fields 6471 to 6475 from the console 63 are to be used as information on the physical storage devices as described later.

If the administrator selects any one of the check boxes 645 and 646, the administrator selects a criterion for determining a data arrangement ratio, which is a ratio of data arranged by means of the striping on the plurality of logical storage devices 280', using any one of checkboxes 6461 to 6464.

If the administrator selects the checkbox 6461, the selection indicates that the data arrangement ratio is to be determined based on the number of the physical storage devices 22 constituting the logical storage devices 280'. If the administrator selects the checkbox 6462, the selection indicates that the data arrangement ratio is to be determined based on information on the RAID of the logical storage devices 280' (such as the level of the RAID). If the administrator selects the checkbox 6463, the selection indicates that the data arrangement ratio is to be determined based on performance information on the physical storage devices 22 (information affecting the throughput such as the type of interface) constituting the logical storage devices 280'. If the administrator selects the checkbox 6464, the selection indicates that the data arrangement ratio is to be determined based on capacities of the logical storage devices 280'.

If the administrator selects the checkbox 647, the administrator is required to input information on the logical storage devices 280' in the fields 6471 to 6475.

The field 6471 stores the number of the physical storage devices 22 constituting the logical storage devices 280'. The field 6472 stores identifiers of RAID groups of the logical storage devices 280'. It should be noted that the administrator can refer to the RAID group number 404 of the physical storage device information 281 in FIG. 4 for inputting the identification numbers of the RAID groups. The field 6473 stores the levels of RAID. The administrator can refer to the values of the RAID level 405 of the physical storage device information 281 illustrated in FIG. 4 for inputting the RAID level.

The field 6474 stores the types of the physical storage devices 22. The administrator can refer to the values of the physical storage device type 407 of the physical storage device information 281 in FIG. 4 for inputting the types of the physical storage devices 22. The field 6475 stores the capacity of the logical storage devices 280'. The administrator can refer to the logical storage device capacity 403 of the physical storage device information 281 in FIG. 4 for inputting the capacity of the logical storage devices 280'.

After the corresponding information is set to the specifications and the checkboxes 645 to 647 of the logical storage volume 2800, when the administrator clicks the building execution button 648, the database management terminal 6 transmits a building instruction of the logical storage volume 2800 to the host computer 1. The building instruction contains the values of the checkboxes and the fields input on the window 64. The DBMS 200 of the host computer 1 builds the logical storage volume 2800 based on the building instruction.

If the number of the physical storage devices, the RAID group information (identification information and RAID levels), and the performance information (physical storage device types) are specified (acquired or input), this embodiment arranges the data so that the performance of the physical storage devices is maximally utilized. On the other hand, if the capacities of the host storage devices are specified (acquired or input), the data is arranged depending on the capacities of the respective host storage devices.

<Processing Overview>

The configuration of this embodiment of this invention has been described. A description is now given of the processing of this embodiment of this invention. When the data management module 210 of the host computer 1 receives the instruction to build the logical storage volume 2800 or the instruction to rebuild the logical storage volume 2800 already built from the database management terminal 6, the data management module 210 outputs an instruction to update the physical storage device information 221 to the physical storage device information acquisition module 220. The physical storage device information acquisition module 220 issues a transmission instruction of the physical storage device information to the storage management terminal 3 or the storage system 2.

A description is now given of a case in which the instruction to build the logical storage volume 2800 or the instruction to rebuild the logical storage volume 2800 is transmitted from the database management terminal 6 according to this embodiment. However, a computer other than the database management terminal 6 may transmit the instruction to build or the instruction to rebuild the logical storage volume 2800, or the instruction may be received from a console, which is not shown, of the host computer 1. Moreover, the physical storage device information acquisition module 220 of the DBMS 200 may acquire the physical storage device information 311 of the storage management terminal 3 or the physical storage device information 281 of the storage system 2 at a predetermined cycle, thereby updating the physical storage device information 221.

The physical storage device acquisition module 220 acquires the physical storage device information 281 (or 311) via the storage system 2, the storage management terminal 3, or the dedicated interface, thereby updating the physical storage device information 221 in the memory 11.

The data management module 210 determines, as the data arrangement ratio, the ratio of data arranged on the plurality of logical storage devices 280a' and 280b' constituting the logical storage volume 2800 by means of the striping based on the physical storage device information 221 acquired by the physical storage device information acquisition module 220 as described later. The data management module 210 updates the data arrangement management information 2100 regarding the determined data arrangement ratio, and defines the logical storage volume 2800 based on the data arrangement management information 2100.

For example, in the case of FIG. 2, the physical storage device information which the host computer 1 can acquire from the storage system 2 is information indicating that the number of the physical storage devices 22 constituting the logical storage device 280a' is three (22a, 22b, and 22c) and the number of the physical storage devices 22 constituting the logical storage device 280b' is two (22d and 22e).

When the data management module 210 evenly arranges data on physical storage devices 22 different from one another, the ratio of data distributed to and arranged on the logical storage devices 280a' and 280b' is determined to 3:2 in proportion to the numbers of the physical storage devices 22, and the ratio is set to the data arrangement ratio 2105 of the data arrangement management information 2100. The data arrangement ratio represents a ratio of data quantity for distributing data to the plurality of logical storage devices 280'.

The data management module 210 then divides data received from the query processing module 230 into a plurality of management units having a predetermined size (such as the stripe size) and distributes the data to the logical storage devices 280a' and 280b' in accordance with the data arrangement ratio.

In other words, the data management module 210 divides the data received from the query processing module 230 into the predetermined management units such as management units "1" to "5" ("1" to "n" denote data management units of the logical storage volume 2800) and stores "1", "3", and "5" in the logical storage device 280a' and stores "2" and "4" in the logical storage device 280b' in accordance with the data arrangement ratio of 3:2 indicated by the data arrangement management information 2100, thereby arranging the data in the distributed manner.

For the following data "6" to "10", the data management module 210 also arranges striped data to the plurality of logical storage devices 280 at the same ratio. It should be noted that the management unit treated by the data management module 210 may be the same as or different from a data quantity of a data block read/written from/to the logical storage devices 280'.

As a result, when the logical storage volume 2800 is built by unifying the plurality of logical storage devices 280 different in combination or configuration of physical storage devices 22, the DBMS 200 can evenly use the physical storage devices 22 of the storage system 2 in accordance with the physical storage device information 221, thereby maximally utilizing the input/output processing performance of all the physical storage devices 22.

<Processing in Detail>

Figure 3:
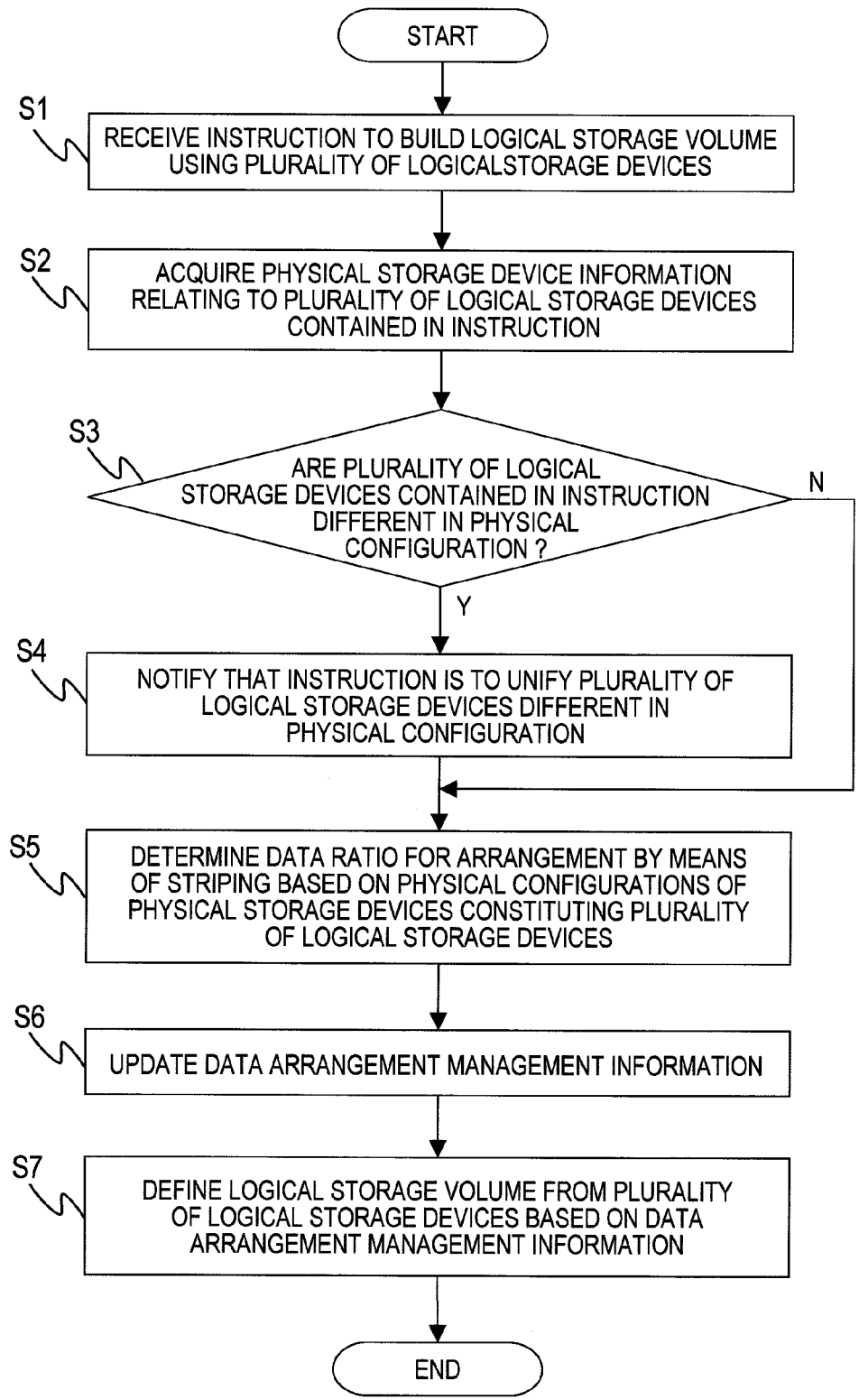
FIG. 3 is a flowchart illustrating a processing sequence of building a logical storage volume by the data management module of the host computer according to the embodiment of this invention.

A detailed description is now given of the processing of this embodiment of this invention. FIG. 3 is a flowchart illustrating a processing sequence of building a logical storage volume 2800 by the data management module 210 of the host computer 1 according to the embodiment of this invention. This processing is executed when the data management module 210 receives the instruction to build the logical storage volume 2800 from the database management terminal 6. It should be noted that the rebuilding instruction is described later referring to FIG. 7.

First, the data management module 210 receives the instruction to build the logical storage volume 2800 from the database management terminal 6 in Step S1. This building instruction contains the information received on the GUI in FIG. 6. It should be noted that the instruction to build or the instruction to rebuild the logical storage volume 2800 may be received from a console (not shown) of the host computer 1.

The data management module 210 instructs the physical storage device information acquisition module 220 to update the physical storage device information 221 in Step S2. The physical storage device information acquisition module 220 acquires, based on the instruction, the physical storage device information 281 or 311 on physical storage devices 22 which are components of logical storage devices 280' contained in the building instruction from the storage system 2 or the storage management terminal 3, thereby updating the physical storage device information 221 on the memory 11.

In Step S3, if a plurality of logical storage devices 280' are contained in the building instruction, the data management module 210 determines whether or not the physical configurations of the physical storage devices 22 constituting each of the logical storage devices 280' are the same.

This determination is based on the determination criterion for the physical configuration received by the database management terminal 6 on the GUI in FIG. 6. The determination criterion for the physical configuration is any one of the checkboxes 6461 to 6464 in FIG. 6. The checkboxes 6461 to 6464 respectively represent the different items in information on the plurality of physical storage devices 22.

In this embodiment, if the checkbox 6461 is selected, the number of the physical storage devices 22 constituting the logical storage devices 280 is used as the determination criterion for the physical configuration. If the checkbox 6462 is selected, the RAID group (or RAID level) constituting the logical storage devices 280 is used as the determination criterion for the physical configuration.

If the checkbox 6463 is selected, the performance information of the physical storage devices 22 constituting the logical storage devices 280 is used as the determination criterion for the physical configuration. If the checkbox 6464 is selected, the capacity of the logical storage devices 280 is used as the determination criterion for the physical configuration. The performance information of the physical storage devices 22 may be the types of interface (FC, SCSI, SATA, and SAS) stored in the physical storage device type 407 of FIG. 4, but the performance information may instead be the seek time, the rpm, or the capacities of the physical storage devices 22.

The data management module 210 proceeds to Step S4 if a determination result is that the physical configurations of the plurality of the logical storage devices 280' are not the same. On the other hand, the data management module 210 proceeds to Step S5 if they are the same.

In Step S4, the data management module 210 warns the database management terminal 6 that the logical storage volume 2800 to be built is formed by unifying the plurality of logical storage devices 280' different in the physical configuration. The database management terminal 6 displays the warning (notification) from the data management module 210 of the host computer 1 on the console 63. On this occasion, a DB administrator or the like may transmit an instruction to stop building the logical storage volume 2800 from the console 63 to the host computer 1, and if the data management module 210 receives the stopping instruction, the data management module 210 can finish the building of the logical storage volume 2800.

In Step S5, the data management module 210 determines the data arrangement ratio, which is the ratio of the data arranged on the plurality of the logical storage devices 280' by means of the striping, based on the criterion for the physical configuration contained in the building instruction input on the GUI in FIG. 6. The data arrangement ratio is determined depending on the difference in the criterion for the physical configuration as follows.

The data arrangement ratio can be determined in accordance with the physical configuration of the physical storage devices 22 constituting the logical storage devices 280' for the following cases (1) to (4), for example.

(1) Data Arrangement Ratio Determined in Accordance with the Number of Physical Storage Devices 22

The number of the physical storage devices 22 constituting the logical storage device 280 is used as the criterion for the data arrangement ratio. For example, when respective numbers of physical storage devices 22 of logical storage devices A, B, and C are different, and when the number of the physical storage devices 22 of the logical storage device A is 4, the number of the physical storage devices 22 of the logical storage device B is 3, and the number of the physical storage devices 22 of the logical storage device C is 2, the data management module 210 determines the data arrangement ratio as 4:3:2.

In other words, if the total number of the physical storage devices 22 constituting the logical storage volume 2800 is n, and the number of the physical storage devices 22 in the logical storage device 280' is x, the distribution ratio to this logical storage device 280' is represented as x/n.

(2) Data Arrangement Ratio Determined in Accordance with RAID Levels of Logical Storage Devices The logical storage devices have the RAID configurations. The data management module 210 acquires the number of physical storage devices 22 accessible from the host computer 1 and determines the data arrangement ratio in accordance with this number and the RAID levels. For example, if the logical storage device A is configured by means of the RAID 5 and has three physical storage devices 22, the logical storage device B is configured by means of the RAID 1 and has two physical storage devices 22, and the logical storage device C is configured by means of the RAID 0 and has two physical storage devices 22, in which a physical storage device for mirroring of the RAID 1 is not accessible from the host computer 1, then the data arrangement ratio is thus determined as 3:1:2 in accordance with the numbers of the physical storage devices 22 excluding the inaccessible physical storage device.

In other words, if the total number of the physical storage devices 22 accessible from the host computer 1 in the logical storage devices 280' constituting the logical storage volume 2800 is n and the number of the physical devices 22 accessible from the host computer 1 in a logical storage device 280' is x, the distribution ratio to this logical storage device 280' is represented as x/n.

(3) Data Arrangement Ratio Determined in Accordance with Performance Information on Physical Storage Devices If the data arrangement ratio is determined in accordance with the performance information on the physical storage devices 22, the data management module 210 determines the data arrangement ratio in accordance with the physical storage device type 407. For example, the data arrangement ratio is determined in accordance with the transfer rate (theoretical value) of the physical storage device type 407 such as 3 for the FC, 2 for the SAS, and 2 for the SATA in the physical storage device type 407.

In other words, the data management module 210 sets a value x for each of the physical storage device types 407 in advance. If the total of the values x of the respective logical storage devices 280' constituting the logical storage volume 2800 is X, the distribution ratio of each of the logical storage devices 280' is represented as x/X.

(4) Data Arrangement Ratio Determined in Accordance with Capacities of Logical Storage Devices If the data arrangement ratio is determined in accordance with the capacities of the logical storage devices, the data management module 210 determines the data arrangement ratio in accordance with the capacities of the respective logical storage devices, thereby using the capacities of the respective logical storage devices without waste. For example, if the capacity of the logical storage device A is 2 TB, the capacity of the logical storage device B is 1 TB, and the capacity of the logical storage device C is 500 GB, the data arrangement ratio determined in accordance with a capacity ratio is 4:2:1.

In other words, the total of the capacities of the logical storage devices 280' constituting the logical storage volume 2800 is X and the capacity of the each of the logical storage devices 280' is Y, the distribution ratio of each of the logical storage devices 280' is represented as Y/X.

In other words, processing in Step S5 is processing of determining in which logical storage device 280' write data to be received from the query processing module 230 is stored in accordance with the data arrangement ratio and processing determining distributed locations of the data.

In Step S6, the data management module 210 stores the information input in FIG. 6 and the data arrangement ratio determined in Step S5 in the data arrangement management information 2100.

Specifically, the data management module 210 sets the name input to the logical storage volume name 641 on the GUI in FIG. 6 to the logical storage volume name 2101 of the data arrangement management information 2100 in FIG. 5, sets the logical storage devices specified in the logical storage device number 643 to the host logical storage device number 2104 of the data arrangement management information 2100, sets the capacity specified in the logical storage volume capacity 642 to the logical storage volume capacity 2103 of the data arrangement management information 2100, sets the data arrangement ratio determined in Step S5 to the data arrangement ratio 2105 of the data arrangement management information 2100, and sets a value set in advance to the stripe size 2106 of the data arrangement management information 2100, thereby building the new logical storage volume 2800.

In Step S7, the data management module 210 defines the logical storage volume 2800 constituted of the plurality of the logical storage devices 280' based on the updated data arrangement management information 2100, and provides the query processing module 230 with the logical storage volume 2800.

When the above-mentioned processing has been completed, if a write request or a read request is issued from the query processing module 230 to the logical storage volume 2800, the data management module 210 writes/reads data to/from the plurality of the logical storage devices 280' constituting the logical storage volume 2800 in accordance with the data arrangement ratio 2105 corresponding to the configuration and combination of the physical storage devices 22.

As described above, the logical storage volume 2800 instructed by the DB administrator from the database management terminal 6 is built for the host computer 1, and the data arrangement ratio 2105 is determined by the data management module 210 of the DBMS 200 corresponding to the configuration and combination of the physical storage devices 22.

If the query processing module 230 of the DBMS 200 issues a write request to the logical storage volume 2800, the data management module 210 divides data received from the query processing module 230 into the predetermined management units, and writes the divided pieces of data respectively to the logical storage devices 280a' and 280b' in accordance with the data arrangement ratio 2105.

For example, if the logical storage device 280a' is constituted of the three physical storage devices 22a, 22b, and 22c, and the logical storage device 280b' is constituted of the two physical storage devices 22d and 22e as illustrated in FIG. 2, and the checkbox 6461 "NUMBER OF PHYSICAL STORAGE DEVICES" is selected on the GUI of FIG. 6, the data management module 210 determines the data arrangement ratio of 3:2 in accordance with the numbers of the physical storage devices 22a-22e, and sets the data arrangement ratio to the data arrangement management information 2100.

When the data management module 210 receives the data to be written from the query processing module 230, the data management module 210 divides the received data in accordance with the predetermined management unit (stripe size according to this embodiment), thus divides the received data into the management units "1"-"5" (hereinafter, referred to as stripes) as illustrated in FIG. 2, for example. The data management module 210 then allocates the divided pieces of data "1"-"5" by means of the round robin in accordance with the data arrangement ratio 2105 to the logical storage device 280a' and the logical storage device 280b'.

As a result, the pieces of data "1", "3", and "5" are allocated to the logical storage device 280a' having the three physical storage devices 22, and the pieces of data "2" and "4" are allocated to the logical storage device 280b' having the two physical storage devices 22, and those pieces of data are written to the respective logical storage devices 280'. The pieces of data are written in parallel to the plurality of physical storage devices 22 in each of the logical storage devices 280'. It should be noted that the read processing is inverse to the above-mentioned processing, and the logical storage devices 280' carry out reading in units of the stripe size in parallel from the physical storage devices 22.

On the other hand, the conventional technology evenly distributes the data to those two logical storage devices 280a' and 280b' without referring to the physical configurations of the physical storage devices 22 constituting the logical storage devices 280a' and 280b'. Therefore, according to the conventional technology, compared with the read/write speeds from/to the logical storage device 280a' constituted of the three physical storage devices 22, the read/write speeds from/to the logical storage device 280b' constituted of the two physical storage devices 22 are low. Therefore, in terms of the read/write performance of the logical storage volume 2800, the logical storage device 280b', which is slow in speed, constitutes a bottle neck, and the performance of the physical storage devices 22 of the logical storage device 280a' becomes excessive.

On the other hand, according to this invention, the data arrangement ratio 2105 for each of the logical storage devices 280' is determined in accordance with the physical configurations of the physical storage devices 22 constituting the logical storage devices 280', and hence the read/write speeds for each of the logical storage devices 280' can be equalized, thereby maximizing the read/write performance of the logical storage volume 2800.

As described above, if a logical storage volume 2800 constituted of a plurality of logical storage devices 280 different in physical configuration using the virtualization function of the storage system is provided for the computer, the data management module 210 according to this invention can set the data arrangement ratio for the plurality of the logical storage devices 280 for maximally using the performance of the physical storage devices 22, thereby using the performance of each of the physical storage devices 22 without waste.

Figure 7:
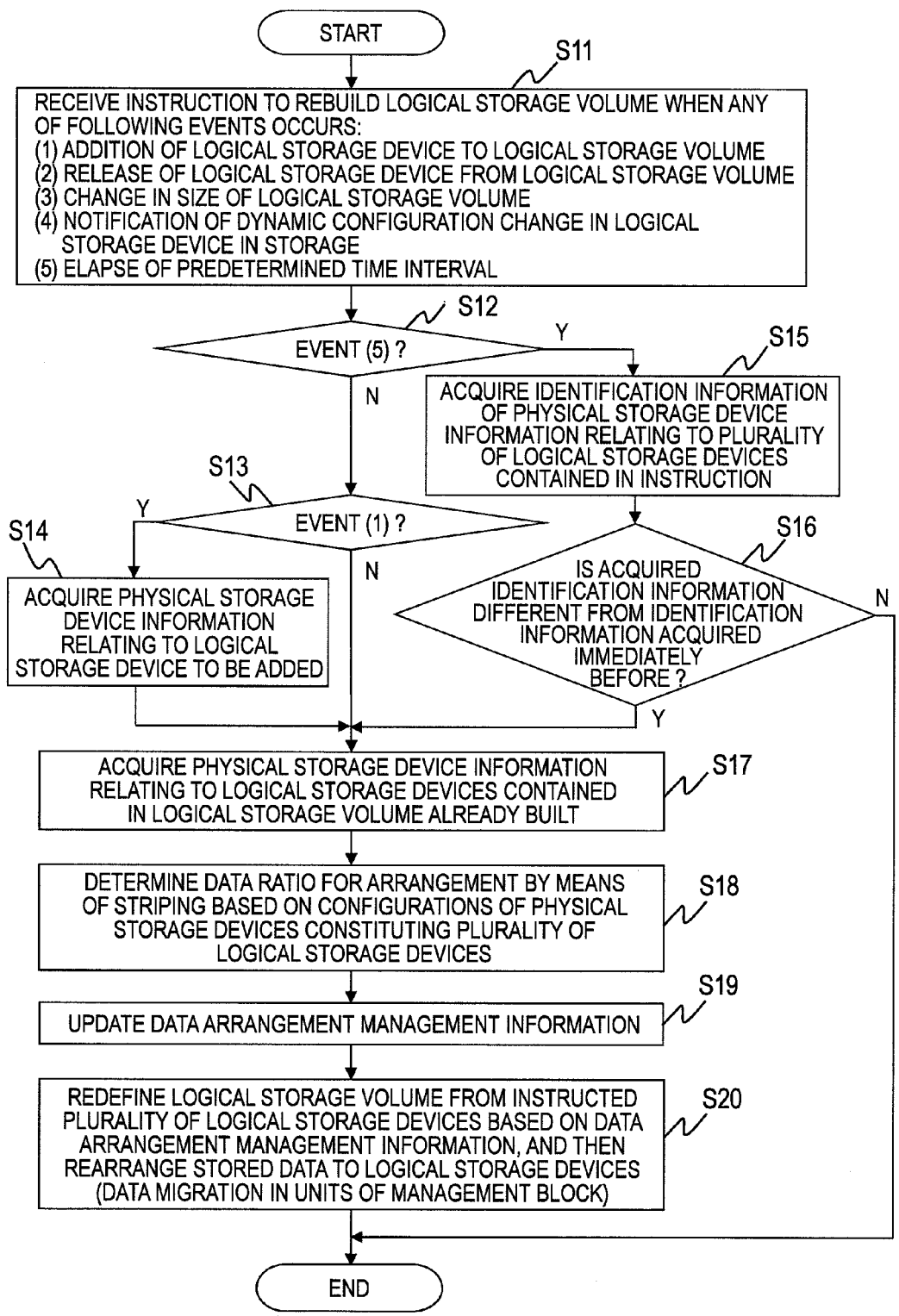
FIG. 7 is a flowchart illustrating a processing sequence of rebuilding, by the data management module of the host computer, a logical storage volume already built according to the embodiment of this invention.

FIG. 7 is a flowchart illustrating a processing sequence of rebuilding, by the data management module 210 of the host computer 1, a logical storage volume 2800 already built according to the embodiment of this invention. In Step S11 of the processing flow, if any one of the following events occurs, the data management module 210 receives the event as an instruction for rebuilding, and starts rebuilding of the logical storage volume 2800 already built.

A first event is an instruction received from the database management terminal 6 in order to add a logical storage device 280 to the logical storage volume 2800. If the DBMS 200 receives the instruction to add the new logical storage device 280 to the existing logical storage volume 2800 from the database management terminal 6, the data management module 210 executes processing starting from Step S12.

A second event is an instruction received from the database management terminal 6 in order to remove a logical storage device 280 from the logical storage volume 2800. If the DBMS 200 receives the instruction to remove the logical storage device 280 from the existing logical storage volume 2800 from the database management terminal 6, the data management module 210 executes processing starting from Step S12.

A third event is an instruction received from the database management terminal 6 in order to change the capacity of the logical storage volume 2800. If the DBMS 200 receives the instruction to change the capacity of the existing logical storage volume 2800 from the database management terminal 6, the data management module 210 executes processing starting from Step S12.

A fourth event is a notification received from the storage system 2 or the storage management terminal 3 indicating a change in configuration of a logical storage device 280. If the DBMS 200 or the DBMS management module 610 receives a notification from the storage system 2 or the storage management terminal 3 indicating a change in configuration of a logical storage device 280' constituting the existing logical storage volume 2800, the database management module 210 executes processing starting from Step S12.

A fifth event is an event instructing the DBMS 200 to periodically activate the data management module 210 to start the processing starting from Step S12. Each time the predetermined period elapses, the DBMS 200 controls the data management module 210 to execute the processing starting from Step S12 of FIG. 7, thereby monitoring a change such as addition or removal of a physical storage device 22 constituting a logical storage device 280 being used by the logical storage volume 2800.

In Step S12, the data management module 210 determines whether or not the data management module 210 has been activated as a result of the fifth event. If the data management module 210 determines that the data management module 210 has been activated as a result of the fifth event (elapse of predetermined period), the data management module 210 monitors a change in configuration of the logical storage devices 280' constituting the logical storage volume 2800 in Steps S15 and S16.

In Step S15, the data management module 210 instructs the physical storage device information acquisition module 220 to acquire the physical storage device information 281 or 311 from the storage system 2 or the storage management terminal 3. It should be noted that the physical storage device information acquisition module 220 may acquire the physical storage device information from a preset one out of the storage system 2 and the storage management terminal 3.

In Step S16, the data management module 210 compares the physical storage device information 221 to the physical storage device information 281 or 331 acquired by the physical storage device information acquisition module 220 from the storage system 2 or the storage management terminal 3, thereby determining whether or not the both pieces of the physical configuration information on the physical storage devices 22 are the same. If the physical storage device information 281 or 331 and the physical storage device information 221 are the same, the data management module 210 determines that there is no change in the physical storage devices 22 constituting the logical storage devices 280', and finishes the processing.

On the other hand, if the acquired physical storage device information and the physical storage device information 221 held by the DBMS 200 are not the same, the physical configuration of the logical storage device 280' has changed, and the data management module 210 proceeds to Step S17.

If it is then determined in Step S12 that the event that has occurred is an event other than the fifth event, in Step S13, the data management module 210 determines whether the generated event is the first event (addition of a logical storage device 280 to the logical storage volume 2800). If the event that has occurred is the first event, the data management module 210 proceeds to Step S14, acquires information on physical storage devices 22 constituting the logical storage device 280 to be added, and proceeds to Step S17. On the other hand, if the event that has occurred is not the first event (occurrence of second to fourth events), the database management module 210 directly proceeds to Step S17.

In Step S17, the data management module 210 then refers to the physical storage device information 221, thereby acquiring information on physical storage devices 22 constituting logical storage devices 280' contained in the logical storage volume 2800 already built.

On this occasion, if the event that has occurred is the first event, and types of the physical storage devices constituting the logical storage device to be added to the logical storage volume 2800 and the types of the physical storage devices 22 constituting the logical storage devices 280' of the existing the logical storage volume 2800 are different, the data management module 210 may output a warning (notification) that the physical configuration of the logical storage device to be added is different from those of the existing logical storage devices to the database management terminal 6 or another terminal. This can prevent the administrator from combining logical storage devices different in physical configuration by mistake, thereby configuring the logical storage volume 2800.

Further, the data management module 210 may output the warning (notification) that the physical configuration is different from those of the existing logical storage devices to the database management terminal 6, and may then receive an instruction to stop rebuilding the logical storage volume 2800 from the database management terminal 6. The data management module 210 stops the processing if the data management module 210 receives the instruction to stop rebuilding the logical storage volume 2800.

In Step S18, as in Step S5 of FIG. 3, the database management module 210 calculates the data arrangement ratio based on the physical configuration of the plurality of logical storage devices 280' constituting the logical storage volume 2800. The criteria for the physical storage device 22 in order to determine the data arrangement ratio are the same as (1)-(4) described in Step S5, and the data management module 210 acquires the data arrangement ratio in accordance with any one of these criteria.

In Step S19, as in Step S6 of FIG. 3, the data management module 210 then stores the information specified by the instruction for rebuilding and the data arrangement ratio determined in Step S18 in the data arrangement management information 2100, thereby updating the data arrangement management information 2100.

In Step S20, as in Step S7 of FIG. 3, the data management module 210 rebuilds (redefines) the logical storage volume 2800 constituted of the plurality of the logical storage devices 280' based on the updated data arrangement management information 2100, and provides the query processing module 230 with the logical storage volume 2800.

The data management module 210 then rearranges the data in accordance with the new data arrangement ratio 2105 for the added logical storage device 280' or the removed logical storage device 280'. If a physical storage device is added to the logical storage device 280b in the example of FIG. 2, for example, the data arrangement ratio is updated from 3:2 to 1:1. The data management module 210 controls the data in the logical storage device 280a' and the logical storage device 280b' to migrate to corresponding logical storage devices 280' for attaining the new ratio.

When the above-mentioned processing has been completed, if a write request or a read request is issued from the query processing module 230 to the logical storage volume 2800, the data management module 210 writes/reads data to/from the plurality of the logical storage devices 280' constituting the rebuilt logical storage volume 2800 in accordance with the data arrangement ratio corresponding to the configuration and combination of the physical storage devices 22.

As described above, the data arrangement ratio 2105 is determined by the data management module 210 of the DBMS 200 corresponding to the physical configuration and the combination of the physical storage devices 22 also for rebuilding the logical storage volume 2800. As a result, the read/write speeds for the respective logical storage devices 280 can be equalized, thereby maximizing the read/write performance of the logical storage volume 2800.

It should be noted that, though the DBMS 200 includes the data management module 210 for determining the data arrangement ratio, and distributing the data to the logical storage devices 280 in the above-mentioned example, the data management module 210 may be provided in the OS 100 of the host computer 1.

Moreover, the logical storage volume 2800 to be provided for the query processing module 230 of the DBMS 200 is constituted using a plurality of logical storage devices 280' recognized by the OS 100 of the host computer 1 in the above-mentioned preferred configuration example. This embodiment is not limited to this configuration, and a logical storage space may be constituted using a plurality of logical storage devices 280 of the storage system 2 recognized by the host computer 1, a logical storage volume 2800 may be built in the logical storage space, a data arrangement ratio may be determined in accordance with the physical configuration of the logical storage devices 280 as described above, and the data may be distributed, and arranged (stored).

Moreover, if the RAID 5 or 6 is applied to the host computer 1 by means of software, the parity may also be distributed and stored based on the data arrangement ratio in addition to the data arranged on the storage system 2.

Moreover, the stripe size 2106 of the data distribution management information 2100 may store a plurality of stripe sizes for respective host logical storage devices as illustrated in FIG. 8 in the above-mentioned configuration, and the data management module 210 may access the different stripe sizes for the respective storage devices 280, thereby managing the substantial data arrangement ratio.

Though the detailed description has been given of this invention referring to the drawings, this invention is not limited to this specific configuration, and includes various variations and equivalent configurations within the gist of the accompanying claims.

As described above, this invention can be applied to a computer system using a storage system provided with a plurality of logical storage devices and a distributed arrangement method for data.

What is claimed is:

1. A data arrangement method of arranging data on a logical storage volume by a computer coupled to a storage system providing a plurality of logical storage devices constituted of a plurality of physical storage devices, the logical storage volume being constituted by unifying the plurality of logical storage devices, the method comprising:

receiving, by the computer, an instruction to build the logical storage volume using the plurality of logical storage devices, or an instruction to rebuild a logical storage volume already built;

acquiring, by the computer, information on the plurality of physical storage devices constituting the respective plurality of logical storage devices contained in the received instruction, wherein acquired information contains at least one of:
- a number of the plurality of physical storage devices constituting each of the logical storage devices;
- redundant array of independent disks (RAID) configuration information relating to the plurality of physical storage devices constituting the logical storage devices;
- performance information on the plurality of physical storage devices constituting the logical storage devices; and
- a capacity of the logical storage devices; and determining, by the computer, arrangement positions of the data on the logical storage volume based on the acquired information on the plurality of physical storage devices, by:
- determining a ratio of data to be arranged by means of striping on the plurality of logical storage devices which constitute the logical storage volume based on the number of the plurality of physical storage devices constituting each of the logical storage devices and the RAID configuration information relating to the plurality of physical storage devices constituting the logical storage devices, wherein determining the ratio comprises, for each logical storage device, dividing the number of the plurality of physical storage devices by a factor corresponding to the RAID configuration information for the logical storage information; and
- building or updating data arrangement management information used for managing the determined ratio of data to be arranged; and arranging the data on the plurality of logical storage devices which constitute the logical storage volume, based on the data arrangement management information according to the determined ratio.

2. The data arrangement method according to claim 1, wherein the acquiring the information comprises:
- transmitting, by the computer, a request to acquire the information on the plurality of physical storage devices to the storage system;
- receiving, by the storage system, the request to acquire the information on the plurality of physical storage devices from the computer; and
- transmitting, by the storage system, the information on the plurality of physical storage devices to the computer in accordance with the request to acquire.

3. The data arrangement method according to claim 1, wherein the acquiring the information comprises:
- transmitting, by the computer, a request to acquire the information on the plurality of physical storage devices to a second computer coupled to the computer and the storage system, and containing the information on the plurality of physical storage devices constituting the respective plurality of logical storage devices;
- receiving, by the second computer, the request to acquire the information on the plurality of physical storage devices from the computer; and
- transmitting, by the second computer, the information on the plurality of physical storage devices to the computer in accordance with the request to acquire.

4. The data arrangement method according to claim 1, wherein:
the computer provides an interface for receiving an input of the information on the plurality of physical storage devices constituting the respective plurality of logical storage devices; and
the acquiring the information comprises acquiring the information on the plurality of physical storage devices based on the input received on the interface.

5. The data arrangement method according to claim 1, wherein:
the computer provides an interface for receiving an input for specifying a part of the information on the plurality of physical storage devices constituting the respective plurality of logical storage devices;
the acquiring the information comprises selectively acquiring the information on the plurality of physical storage devices based on the input received on the interface; and
the determining the arrangement positions of the data comprises determining the arrangement positions of the data on the logical storage volume based on the information on the plurality of physical storage devices selectively acquired.

6. The data arrangement method according to claim 1, wherein the receiving the instruction comprises receiving any one of the following events: an instruction to add a new logical storage device to the logical storage volume already built, an instruction to remove a specific logical storage device contained in the logical storage volume already built, an instruction to change a capacity of the logical storage volume already built, a notification of a dynamic configuration change relating to a plurality of physical storage devices constituting a logical storage device contained in the logical storage volume already built, and an elapse of a predetermined period occurs, the event as the instruction to rebuild the logical storage volume already built.

7. The data arrangement method according to claim 1, wherein the determining the arrangement positions of the data comprises determining whether the plurality of physical storage devices constituting the respective plurality of logical storage devices contained in the received instruction are the same in configuration, and outputting a warning when the plurality of physical storage devices are not the same in configuration.

8. The data arrangement method according to claim 1, wherein the factor corresponding to RAID configuration information indicating that the logical storage device has a RAID 0 configuration is 1 and the factor corresponding to RAID configuration information indicating that the logical storage device has a RAID 1 configuration is 2.

9. A data management system, comprising:
a storage system for providing a plurality of logical storage devices constituted of a plurality of physical storage devices; and
a computer including a logical storage volume management module for building a logical storage volume by unifying the plurality of logical storage devices, and arranging data on the logical storage volume, and a physical storage device information acquisition module for acquiring information on the plurality of physical storage devices constituting the respective plurality of logical storage devices, the computer being coupled to the storage system, the computer construed to effect operations of:
receiving an instruction to build the logical storage volume using the plurality of logical storage devices, or an instruction to rebuild a logical storage volume already built;

acquiring information on the plurality of physical storage devices constituting the respective plurality of logical storage devices contained in the received instruction, wherein acquired information contains at least one of:
    a number of the plurality of physical storage devices constituting each of the logical storage devices;
    redundant array of independent disks (RAID) configuration information relating to the plurality of physical storage devices constituting the logical storage devices;
    performance information on the plurality of physical storage devices constituting the logical storage devices; and
    a capacity of the logical storage devices; and
determining arrangement positions of the data on the logical storage volume based on the acquired information on the plurality of physical storage devices, by:
    determining a ratio of data to be arranged by means of striping on the plurality of logical storage devices which constitute the logical storage volume based on the number of the plurality of physical storage devices constituting each of the logical storage devices and the RAID configuration information relating to the plurality of physical storage devices constituting the logical storage devices, wherein determining the ratio comprises, for each logical storage device, dividing the number of the plurality of physical storage devices by a factor corresponding to the RAID configuration information for the logical storage device; and
    building or updating data arrangement management information used for managing the determined ratio of data to be arranged; and arranging the data on the logical storage volume based on the data arrangement management information according to the determined ratio.

10. The data management system according to claim 9, wherein:
the storage system includes the information on the plurality of physical storage devices constituting the respective plurality of logical storage devices to be provided to the computer, and a control module for receiving a request from the computer, and carrying out processing in response to the request;
the physical storage device information acquisition module transmits to the storage system a request to acquire the information on the plurality of physical storage devices constituting the respective plurality of logical storage devices contained in the instruction; and
the control module receives the request to acquire, and transmits the information on the plurality of physical storage devices to the computer in accordance with the request to acquire.

11. The data management system according to claim 9, further comprising a second computer coupled to the computer and the storage system, and including the information on the plurality of physical storage devices constituting the respective plurality of logical storage devices provided by the storage system, wherein:
the physical storage device information acquisition module of the computer transmits to the second computer a request to acquire the information on the plurality of physical storage devices constituting the respective plurality of logical storage devices contained in the instruction; and the second computer receives the request to acquire, and transmits the information on the plurality of physical storage devices to the computer in accordance with the request to acquire.

12. The data management system according to claim 9, wherein the physical storage device information acquisition module is configured to:
provide an interface for receiving an input of the information on the plurality of physical storage devices constituting the respective plurality of logical storage devices; and
acquire the information on the plurality of physical storage devices based on the input received on the interface.

13. The data management system according to claim 9, wherein the factor corresponding to RAID configuration information indicating that the logical storage device has a RAID 0 configuration is 1 and the factor corresponding to RAID configuration information indicating that the logical storage device has a RAID 1 configuration is 2.

14. A data arrangement method of arranging data on a logical storage volume by a host computer coupled to a storage system providing a plurality of logical storage devices constituted of a plurality of physical storage devices, the method comprising:
receiving, by the computer, an instruction to build the logical storage volume or an instruction to rebuild a logical storage volume already built, by unifying at least a sub-plurality of the plurality of logical storage devices, wherein both the logical storage volume and the logical storage devices are recognized by an operating system (OS) and at least one application of the host computer;
acquiring, by the host computer, from the storage system, real-time configuration and/or performance criteria on the plurality of physical storage devices constituting the respective plurality of logical storage devices contained in the received instruction, wherein acquired information contains at least one of:
    a number of the plurality of physical storage devices constituting each of the logical storage devices;
    RAID configuration information relating to the plurality of physical storage devices constituting the logical storage devices;
    performance information on the plurality of physical storage devices constituting the logical storage devices; and
    a capacity of the logical storage devices; and
determining, by the computer, arrangement positions of the data on the logical storage volume recognized by the operating system (OS) and the at least one application of the host computer, based on the acquired real-time configuration and/or performance criteria on the plurality of the physical storage devices, by:
    determining a ratio of data to be arranged by means of striping on the plurality of logical storage devices which constitute the logical storage volume based on the number of the plurality of physical storage devices constituting each of the logical storage devices and the RAID configuration information relating to the plurality of physical storage devices constituting the logical storage devices, wherein determining the ratio comprises, for each logical storage device, dividing the number of the plurality of physical storage devices by a factor corresponding to the RAID configuration information for the logical storage device; and
    building or updating data arrangement management information used for managing the determined ratio of data to be arranged; and arranging the data on the plurality of logical storage devices which constitute the logical storage volume, based on the data arrangement management information according to the determined ratio.

15. The data arrangement method according to claim 14, wherein the factor corresponding to RAID configuration information indicating that the logical storage device has a RAID 0 configuration is 1 and the factor corresponding to RAID configuration information indicating that the logical storage device has a RAID 1 configuration is 2.

* * * * *